United States Patent [19]
Holdengraber et al.

[11] Patent Number: 6,143,271
[45] Date of Patent: Nov. 7, 2000

[54] PROCESS FOR PRODUCING POTASSIUM SULFATE FROM POTASH AND SODIUM SULFATE

[75] Inventors: Curt Holdengraber, Kiryat Tivon; Shalom Lampert, Maalot, both of Israel

[73] Assignee: Dead Sea Works, Beer Sheva, Israel

[21] Appl. No.: 09/152,103

[22] Filed: Sep. 14, 1998

[51] Int. Cl.$^7$ .................................................. C01D 5/00
[52] U.S. Cl. ...................... 423/552; 423/199; 23/302 R
[58] Field of Search ..................... 423/199, 552; 23/302 R

[56] References Cited

U.S. PATENT DOCUMENTS

| | | | |
|---|---|---|---|
| 1,321,282 | 11/1919 | Burnham | 423/199 |
| 1,936,070 | 11/1933 | Ritchie et al. | 423/552 |
| 1,990,896 | 2/1935 | Connell | 423/552 |
| 3,369,867 | 2/1968 | May | 423/199 |
| 4,174,382 | 11/1979 | Menche | 423/552 |
| 4,215,100 | 7/1980 | Sokolov et al. | 423/552 |
| 5,529,764 | 6/1996 | Lampert et al. | 423/199 |
| 5,552,126 | 9/1996 | Efraim et al. | 423/199 |

FOREIGN PATENT DOCUMENTS

| | | | |
|---|---|---|---|
| 244540 | 4/1987 | German Dem. Rep. | 423/199 |
| 273 427 | 11/1989 | German Dem. Rep. | 423/552 |
| 710945 | 1/1980 | U.S.S.R. | 423/552 |
| 829567 | 5/1981 | U.S.S.R. | 423/552 |
| 1557102 | 4/1990 | U.S.S.R. | 423/552 |
| 439287 | 11/1935 | United Kingdom | 423/552 |
| 464040 | 4/1937 | United Kingdom | 423/552 |

OTHER PUBLICATIONS

Mullin, J.W, "Crystallization", 2$^{nd}$ Edition, pp. 258–299, 1972 (No Month).

*Primary Examiner*—Ngoc-Yen Nguyen
*Attorney, Agent, or Firm*—Mark M. Friedman

[57] ABSTRACT

The present invention provides a process for producing potassium sulfate from a potash and a sodium sulfate source, comprising the steps of: (a) treating a portion of the potash source and sodium sulfate source, such that glaserite is crystallized out of solution and a first mother liquor is produced; (b) converting the glaserite to precipitate potassium sulfate in a second mother liquor; (c) recycling the second mother liquor to the portion of the potash source and sodium sulfate source; (d) subjecting the first mother liquor to evaporative crystallization to produce sodium chloride in a third mother liquor; and (e) recycling the third mother liquor to the portion of the potash source and sodium sulfate source.

17 Claims, 6 Drawing Sheets

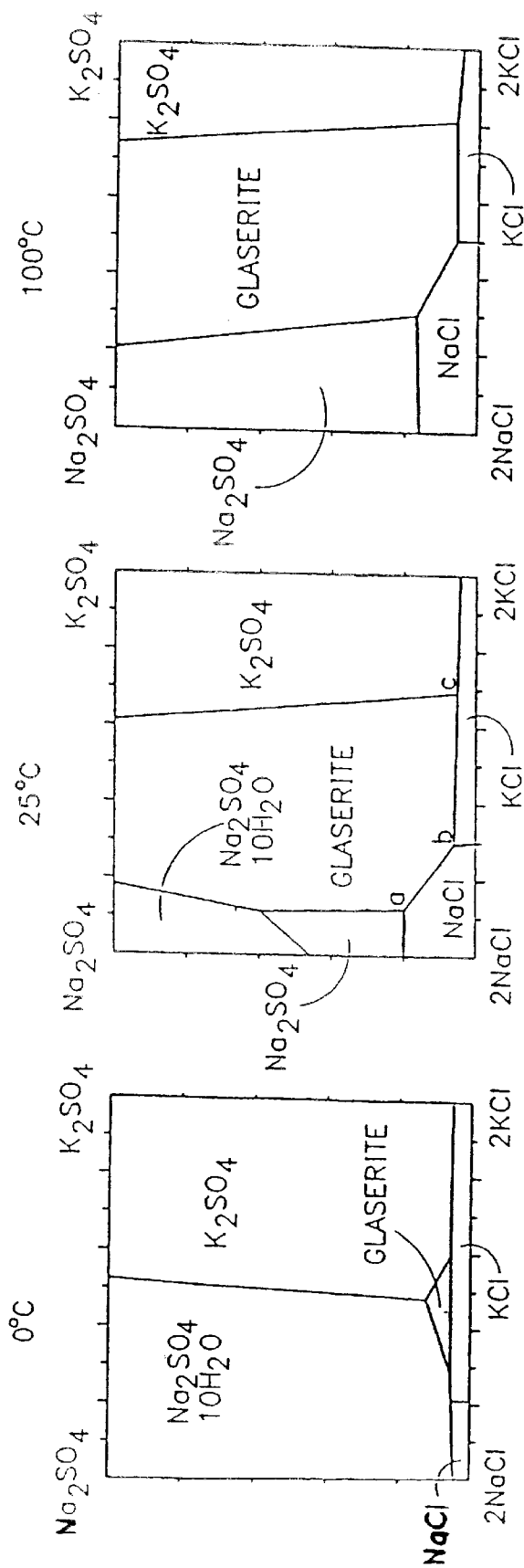

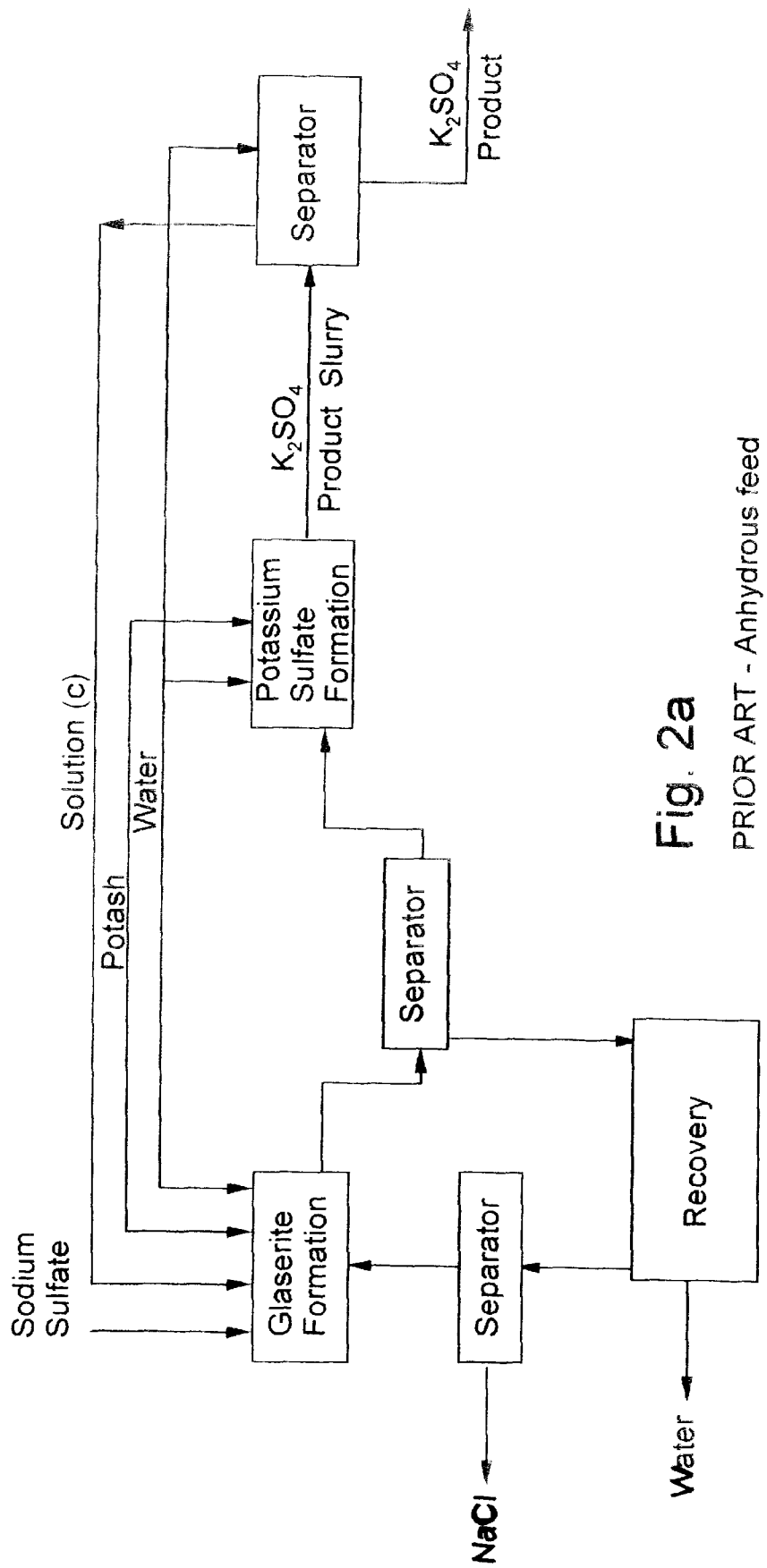
Fig. 2a PRIOR ART - Anhydrous feed

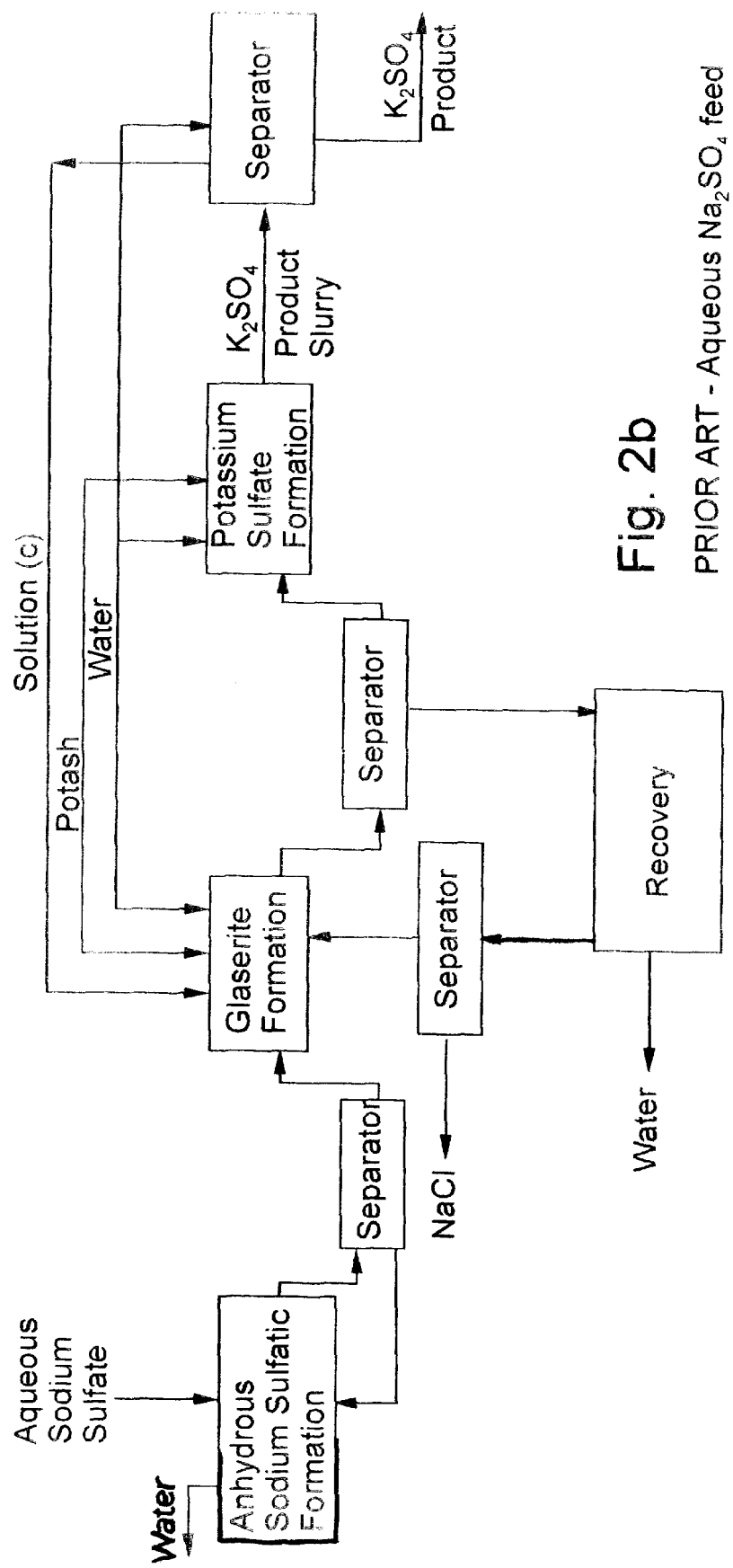
Fig. 2b  PRIOR ART - Aqueous Na₂SO₄ feed

Table 1

Invariant Point Composition for the
$Na_2SO_4$-$NaCl$-$K_2SO_4$-$KCl$/$H_2O$ system
(T=25°C)

| Invariant Point (4, 5) | Component * | | |
|---|---|---|---|
| | K+ (mole %) | Cl- (mole %) | $H_2O$ (mole/mole salts) |
| a | 14.6 | 79.2 | 14.9 |
| b | 29.3 | 93.7 | 14.7 |
| c | 68.6 | 94.5 | 19.5 |

* all values in double equivalents

Fig. 5

PROCESS FOR PRODUCING POTASSIUM SULFATE FROM POTASH AND SODIUM SULFATE

FIELD OF THE INVENTION

The present invention relates to processes for producing potassium. sulfate, and more particularly, to processes for producing potassium sulfate from sources of potash and sodium sulfate.

BACKGROUND OF THE INVENTION

The overall reaction for producing potassium sulfate from sodium sulfate and potash can be described as:

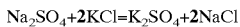

$$Na_2SO_4 + 2KCl = K_2SO_4 + 2NaCl$$

In water, however, the reaction is subject to the thermodynamic constraints of the $Na_2SO_4$–$2KCl$–$K_2SO_4$–$2NaCl$/$H_2O$ system. The data for the system are best represented on a Janecke phase diagram (FIG. 1). The relevant invariant points are:

(a) solution in equilibrium with $Na_2SO_4$, NaCl, and glaserite ($K_3Na(SO_4)_2$);
(b) solution in equilibrium with KCl, NaCl, and glaserite;
(c) solution in equilibrium with KCl, $K_2SO_4$, and glaserite.

The compositions of the invariant points at 25° C. are given in Table 1 (FIG. 5).

From the phase diagram, it is evident that for any feed mixture of potash, sodium sulfate, and water, pure sodium chloride cannot be removed as a by-product. In addition, a reasonable potassium conversion can only be achieved in a two-stage reaction, via the intermediate product glaserite, consisting of (FIG. 2a):

1. Production of glaserite from sodium sulfate, potash, and Stage 2 liquor;
2. Production of potassium sulfate and Stage 2 liquor from potash, water, and glaserite from Stage 1.

The glaserite produced in Stage 1 is separated from the mother liquor and introduced to Stage 2. The mother liquor contains substantial quantities of dissolved potassium and sulfate, which generally warrants a recovery operation. While the currently-known processes differ primarily in the scheme used to retrieve the potassium and sulfate, the reaction stages are very similar.

There are numerous problems associated with the solid/liquid separation of glaserite. Since known processes produce glaserite via out-salting, the glaserite produced is characteristically fine. Somewhat larger glaserite crystals can be obtained by out-salting, but this requires a longer residence time and more sophisticated crystallization equipment.

Small glaserite particles filter poorly. Moreover, the amount of adhering mother liquor is greatly increased with decreasing particle size. This mother liquor is rich in sodium (65–86 mole %) and in chloride (75–95 mole %). The bulk of the sodium and chloride introduced to Stage 2 must be dissolved in the effluent liquor. Since at the optimal theoretical operating point (the $KCl/K_2SO_4$/glaserite/$H_2O$ invariant point), the solution contains approximately 71% $H_2O$ and under 3% sodium, about 25 kg of excess water must be added in Stage 2 to remove each additional kg of sodium introduced.

'Sodium poisoning' resulting from the liquor adhering to the glaserite increases the feed water requirements (FIG. 3), and hence, the evaporation load in the recovery stage. Energy costs are further increased because of additional heating and cooling costs for the enlarged recycle streams. Equipment costs are is increased correspondingly.

Large glaserite particles are more easily filtered and contain appreciably-less mother liquor.

The use of Glauber's salt (sodium sulfate decahydrate) in the production of potassium sulfate is known in the prior art. It is well-known that the additional water from the Glauber's salt decreases the conversion in the reaction stages and increases the sulfate composition of the Stage 1 effluent. Some cyclic processes cannot be operated using Glauber's salt; others require additional unit operations (e.g. evaporation).

The water-to-sodium sulfate ratio in sodium sulfate solutions is significantly higher than that of Glauber's salt, such that the problem of excess water worsens considerably.

Hence according to prior art, water-containing sources of sodium sulfate are generally subjected to evaporative crystallization to produce the anhydrous salt. The solids are separated from the mother liquor and introduced to one of the conventional process schemes for producing potassium sulfate from potash and anhydrous sodium sulfate.

The production of anhydrous sodium sulfate from Glauber's salt, sodium sulfate solutions and other sources of sodium sulfate is both capital-intensive and energy-intensive. Thus, there is a widely recognized need for a more efficient and more economical way of producing potassium sulfate from these sodium sulfate sources than heretofore known.

SUMMARY OF THE INVENTION

A first object of the present invention is to produce the glaserite intermediate in the production of potassium sulfate via evaporative crystallization and not by out-salting, such that glaserite with superior characteristics for settling, filtering and handling and with a lower content of adhering mother liquor is produced.

A second object of the present invention is to provide a process for producing potassium sulfate from potash and sodium sulfate solutions, without the production of anhydrous sodium sulfate or Glauber's salt in an intermediate stage.

A third object of the present invention is to produce potassium sulfate that is free of insoluble matter and hence suitable for fertigation.

In a first embodiment the present invention provides a process for producing potassium sulfate from a potash source and a sodium sulfate source, comprising the steps of: (a) treating a portion of the potash source and sodium sulfate source, such that glaserite is crystallized out of solution and a first mother liquor is produced; (b) converting the glaserite to precipitate potassium sulfate in a second mother liquor; (c) recycling the second mother liquor to step (a); (d) subjecting the first mother liquor to evaporative crystallization to produce sodium is chloride in a third mother liquor; and (e) recycling the third mother liquor to step (a).

In a preferred embodiment the step of converting glaserite to precipitate potassium sulfate uses an additional portion of the potash source.

In a preferred embodiment the additional portion of the potash source is an excess of the portion of the potash source from step (a).

In a preferred embodiment the step of treating a portion of the potash source and sodium sulfate source includes evaporative crystallization.

In a preferred embodiment the step of treating a portion of the potash source and sodium sulfate source includes cooling crystallization.

In a preferred embodiment a portion of the potash source and the sodium sulfate source are premixed to form a solution prior to treating the portion of the potash source and sodium sulfate source.

In a preferred embodiment the sodium sulfate source includes Glauber's salt.

In a preferred embodiment the sodium sulfate source includes a solution containing sodium sulfate.

In a preferred embodiment the sodium sulfate source includes glauberite.

In a preferred embodiment the sodium sulfate source includes salt cake.

In a preferred embodiment the sodium sulfate source includes sodium sulfate of from about 5 percent to about 90 percent purity.

In a preferred embodiment the glaserite formation is achieved at a temperature of from about 15° C. to about 110° C.

In a preferred embodiment the insoluble matter from the potash source and sodium sulfate source is removed by filtration resulting in substantially fully soluble potassium sulfate.

As used herein in the specification and in the claims section below, the term 'sodium sulfate solutions' refers to any solution containing dissolved sodium sulfate.

As used herein in the specification and in the claims section below 'sodium sulfate source' refers to a solid and/or solution containing sodium sulfate as a main component.

As used herein in the specification and in the claims section below 'potash source' refers to a solid and/or solution containing potassium chloride as a main component.

As used herein in the specification and in the claims section below 'salt cake' refers to impure sodium sulfate with a purity of from about 90 percent to about 99 percent.

As used herein in the specification and in the claims section below 'substantially fully soluble' refers to a quality of potassium sulfate suitable for fertigation and other refined applications.

It should be noted that in the prior art, the use of Glauber's salt, glauberite, aqueous solutions containing sodium sulfate, etc., requires major additional process stages, including melting, evaporative crystallization (or both), and dewatering. These additional stages complicate the process and significantly increase the capital investment and operating costs.

According to the prior art, the glaserite intermediate is produced by out-salting and has poor settling, filtering and handling characteristics. Alternatively, large and sophisticated crystallization equipment can be used to improve the particle size of the glaserite.

The potassium sulfate produced according to the prior art contains insoluble material from the sodium sulfate and potash sources. The insoluble material can hamper process operations and generally makes the potassium sulfate product unsuitable for fertigation or other refined applications.

By contrast, the present invention eliminates the additional process stages associated with the production of anhydrous sodium sulfate in an intermediate stage. Moreover, since the glaserite is produced from solution, the glaserite crystals obtained are coarse, such that the dewatering and handling operations are greatly improved. In addition, the present invention allows the removal of insoluble matter from solution, such that the potassium sulfate produced is substantially fully-soluble and suitable for specialty applications including fertigation.

BRIEF DESCRIPTION OF THE DRAWINGS

The invention is herein described, by way of example only, with reference to the accompanying drawings, wherein:

FIGS. 1a, 1b and 1c are solution phase diagrams for the $Na_2SO_4/2NaCl/K_2SO_4/2KCl/H_2O$ system at 0°, 25° and 100° C., respectively;

FIGS. 2a and 2b are block diagrams schematically depicting processes according to prior art;

FIG. 5 is a table of invariant point compositions for the $Na_2SO_4/2NaCl/K_2SO_4/2KCl/H_2O$ system.

DETAILED DESCRIPTION OF THE PREFERRED EMBODIMENTS

The present invention discloses processes, which produce potassium sulfate from sources of potash and sodium sulfate. The principles and operation of these processes according to the present invention may be better understood with reference to the drawings and the accompanying description.

Figure 3:
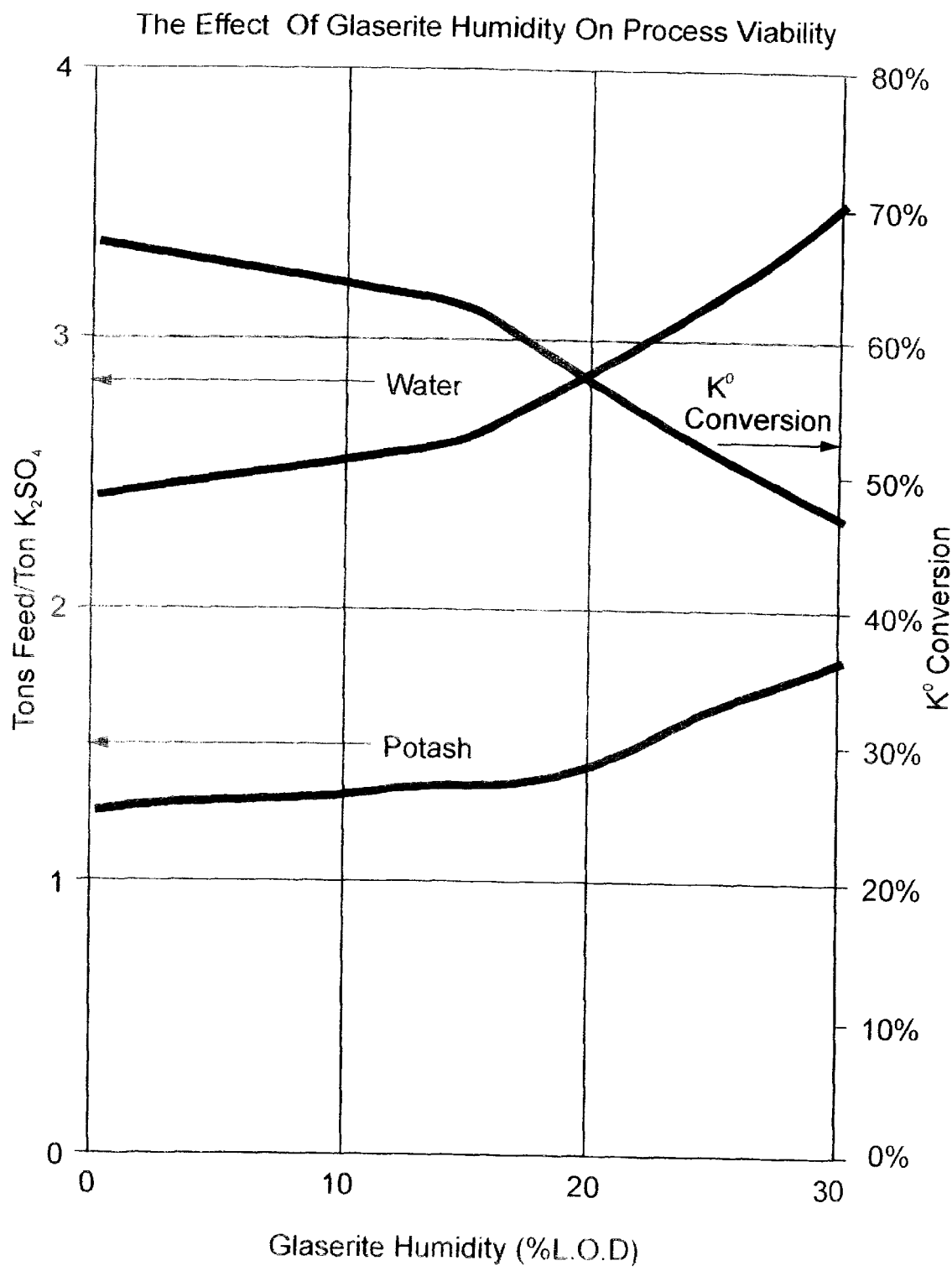
FIG. 3 shows the effect of glaserite humidity on process viability.
Figure 4:
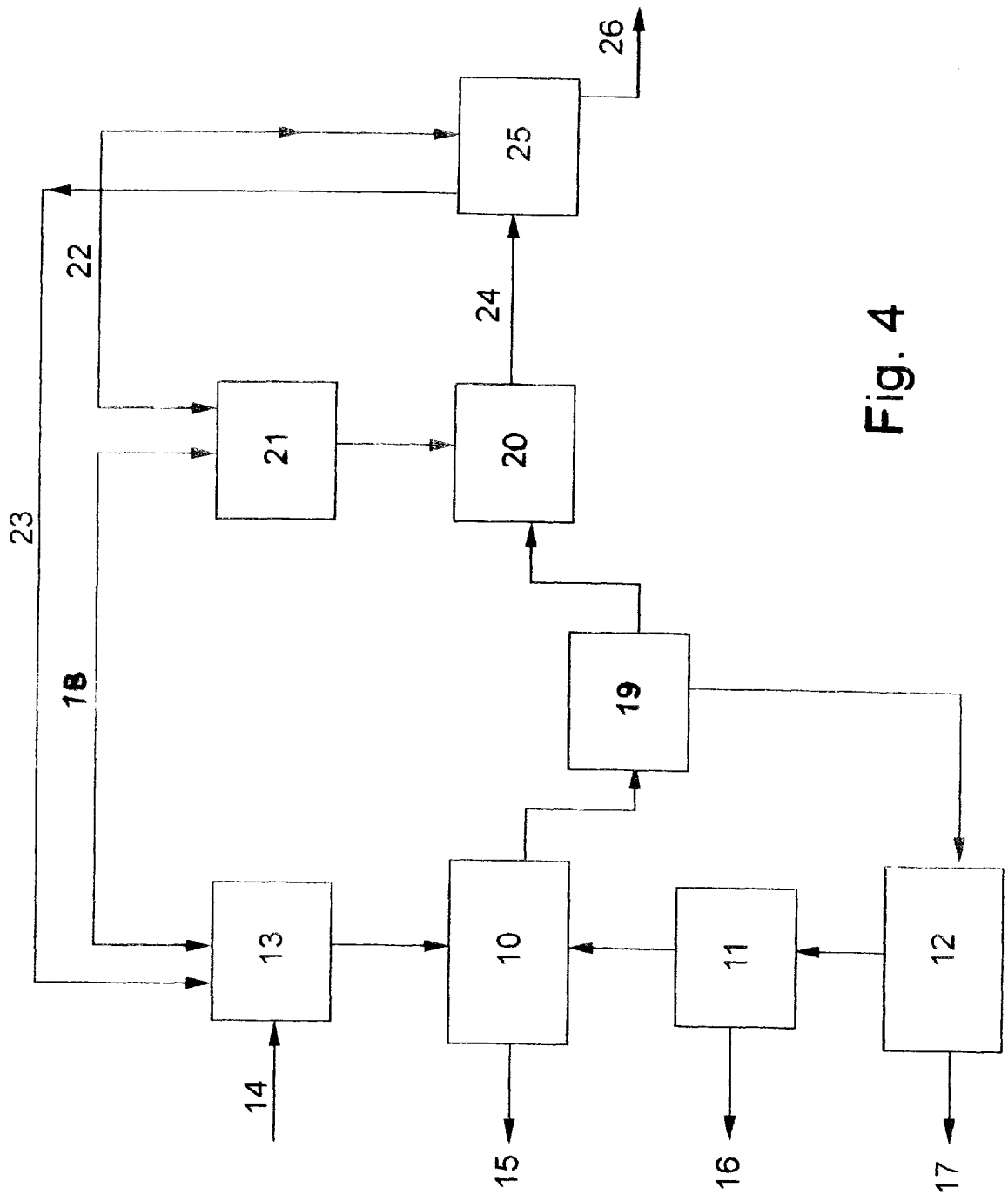
FIG. 4 is a block diagram schematically depicting processes according to the present invention.

FIG. 4 illustrates several embodiments of the present invention. Stage 1 is directed at formation of glaserite 10. To this end, sodium sulfate solution 14, a first portion of potash solids 18 and brine 23 from Stage 2 (see below) are mixed, such that the potash dissolves. The dissolution 13 can be facilitated by heating. The solution obtained can be filtered to remove insoluble matter, and is then subjected to crystallization, such as evaporative crystallization, cooling crystallization and the like, as a result of which glaserite crystallizes out of solution. The slurry is dewatered in a separator 19 and delivered to Stage 2, which is dedicated to glaserite decomposition or potassium sulfate formation 20.

Stage 1, the formation of glaserite 10, can be effected preferably at a temperature of from about 15° C. to about 110° C. A multiple-effect evaporative crystallization system can be used, with the final-stage performed most preferably at a temperature of from about 30° C. to about 50° C.

The resulting mother liquor has the following percentage weight composition: potassium: 2.5–6%, sodium: 7.5–10%, chloride: 13–17%, sulfate: 1.3–5%, water: the balance. The mother liquor composition corresponds to the points on and above the NaCl/glaserite equilibrium line. The mother liquor has a high concentration of sodium and chloride, but also contains substantial quantities of potassium and sulfate. The liquor undergoes evaporative crystallization in Stage 3, 12. In this stage the sodium chloride produced is separated from the mother liquor and recovered as a co-product 16. The potassium and sulfate ions, which have been concentrated in the mother liquor, are recycled to Stage 1, 10.

In stage 2, the decomposition of glaserite 20 is performed preferably at a temperature of from about 15° C. to about 90° C., with the preferred temperature range being from about 20° C. to about 50° C. Potash 18 and water 22 are introduced along with the solids obtained from the glaserite crystallization stage 19. The potash 18 and water 22 can be mixed separately and the solution obtained can be filtered to remove insoluble matter to produce substantially fully soluble potassium sulfate.

In the glaserite decomposition stage 20, the glaserite solids dissolve, generating a supersaturation solely with respect to potassium sulfate, such that potassium sulfate selectively precipitates. The maximum conversion is obtained when the mother liquor approaches the KCl/K$_2$SO$_4$/glaserite/H$_2$O invariant point. The potassium sulfate slurry 24 is separated 25, washed with water 22 and dried. The mother liquor removed from the reactor is recycled to the previous stage; the washwater, however, can be used in the decomposition of glaserite.

While the invention has been described with respect to a limited number of embodiments, it will be appreciated that many variations, modifications and other applications of the invention can be made.

What is claimed is:

1. A process for producing potassium sulfate from a potash source and a sodium sulfate source, comprising the steps of:
   (a) treating a portion of the potash source and the sodium sulfate source, such that glaserite is crystallized out of solution by evaporative cystallization or cooling cystallization thereby obviating the need for the production of intermediate sodium sulfate salts, and a first mother liquor is produced;
   (b) converting the glaserite to precipitate potassium sulfate in a second mother liquor;
   (c) recycling said second mother liquor to step (a);
   (d) subjecting said first mother liquor to evaporative crystallization to produce sodium chloride in a third mother liquor; and
   (e) recycling said third mother liquor to step (a).

2. The process of claim 1, wherein said step of converting glaserite to precipitate potassium sulfate uses an additional portion of the potash source.

3. The process of claim 2, wherein said additional portion of the potash source is an excess of said portion of the potash source from step (a).

4. The process of claim 1, wherein the step of treating a portion of the potash source and sodium sulfate source includes evaporative crystallization.

5. The process of claim 1, wherein the step of treating a portion of the potash source and sodium sulfate source includes cooling crystallization.

6. The process of claim 1, wherein the potash source and the sodium sulfate source are premixed to form a solution prior to treating said portion of the potash source and sodium sulfate source.

7. The process of claim 1, wherein said sodium sulfate source includes Glauber's salt.

8. The process of claim 1, wherein said sodium sulfate source includes a solution containing sodium sulfate.

9. The process of claim 1, wherein said sodium sulfate source includes glauberite.

10. The process of claim 1, wherein said sodium sulfate source includes salt cake.

11. The process of claim 1, wherein said sodium sulfate source includes sodium sulfate of from about 5 percent to about 90 percent purity.

12. The process of claim 1, wherein said glaserite formation is achieved at a temperature of from about 15° C. to about 110° C.

13. The process of claim 1, wherein insoluble matter from the potash source and sodium sulfate source is removed by filtration resulting in substantially fully soluble potassium sulfate.

14. The process of claim 1, wherein said intermediate sodium sulfate salts include Glauber's salt.

15. The process of claim 1, wherein said intermediate sodium sulfate salts include anhydrous sodium sulfate.

16. The process of claim 1, wherein said intermediate sodium sulfate salts include Glauber's salt and anhydrous sodium sulfate.

17. A process for producing potassium sulfate from a potash source and a sodium sulfate source, consisting essentially of steps:
   (a) treating a portion of the potash source and the sodium sulfate source, such that glaserite is crystallized out of solution and a first mother liquor is produced;
   (b) converting the glaserite to precipitate potassium sulfate in a second mother liquor;
   (c) recycling said second mother liquor to step (a);
   (d) subjecting said first mother liquor to evaporative crystallization to produce sodium chloride in a third mother liquor; and
   (e) recycling said third mother liquor to step (a).

* * * * *